United States Patent [19]

Lewis

[11] Patent Number: 5,446,113
[45] Date of Patent: Aug. 29, 1995

[54] METHOD FOR MAKING HEAT CURABLE ZERO VALENT PLATINUM-VINYLSILANE SILICONE COMPOSITIONS

[75] Inventor: Larry N. Lewis, Scotia, N.Y.

[73] Assignee: General Electric Company, Schenectady, N.Y.

[21] Appl. No.: 238,892

[22] Filed: Apr. 28, 1994

[51] Int. Cl.$^6$ .............................................. C08G 77/06
[52] U.S. Cl. ...................................... 528/15; 524/730
[58] Field of Search ........................... 528/15; 524/730

[56] References Cited

U.S. PATENT DOCUMENTS

| | | |
|---|---|---|
| 3,715,334 | 2/1973 | Karstedt . |
| 3,775,452 | 11/1973 | Karstedt . |
| 4,256,616 | 3/1981 | Hatanaka et al. .................. 525/478 |
| 5,331,075 | 7/1974 | Sumpter et al. ..................... 525/478 |

*Primary Examiner*—Melvyn I. Marquis
*Attorney, Agent, or Firm*—William H. Pittman

[57] ABSTRACT

A method is provided for making platinum catalyzed heat curable organopolysiloxane compositions which have an enhanced rate of cure by using a silicon hydride siloxane in combination with a devolatilized mixture of a vinyl silicone fluid and a reaction product of a zero valent platinum complex and a vinylsilane.

4 Claims, No Drawings

METHOD FOR MAKING HEAT CURABLE ZERO VALENT PLATINUM-VINYLSILANE SILICONE COMPOSITIONS

BACKGROUND OF THE INVENTION

The present invention is directed a method for making heat curable platinum catalyzed silicone compositions having an enhanced cure rate. More particularly, the present invention relates to the employment of a silicon hydride siloxane in combination with a devolatilized mixture of a zero valent platinum-vinylsilane complex and a vinyl siloxane fluid.

Prior to the present invention, as shown by Karstedt, U.S. Pat. Nos. 3,775,452, and 3,715,334, platinum complexes were provided resulting from the reaction of a platinum halide and an unsaturated organosilicon material. These platinum complexes were useful in providing heat curable platinum containing organopolysiloxane compositions. Additional platinum catalyzed heat curable organopolysiloxane compositions are constantly being evaluated by the organosilicon industry to enhance their cure rates.

SUMMARY OF THE INVENTION

The present invention is based on the discovery that an improvment in the cure rate of a heat activated platinum containing organopolysiloxane composition can be achieved if there is initially prepared a reaction product of a platinum halide, such as chloroplatinic acid, and a vinylsilane. The reaction product, sometimes referred to hereinafter as the "zero valent platinum complex", can be used to make a "devolatilized" mixture of the zero valent platinum complex and a vinyl siloxane fluid. As used hereinafter, the term devolatilized or devolatilization means heating the mixture of the zero valent platinum catalyst and the vinylsiloxane fluid at a temperature of 25° C. to 100° C. and a pressure of 0.1 torr to 100 torr until the resulting product is substantially free of volatiles, ie incapable of providing a vapor pressure exceeding 0.1 atmospheres at a temperature in the range of 25° C. to 50° C.

This devolatilized mixture has been found useful in making heat curable platinum catalyzed organopolysiloxane compositions having improved rates of cure when employed with a silicon hydride siloxane.

STATEMENT OF THE INVENTION

There is provided by the present invention, a method for making a platinum catalyzed heat curable organopolysiloxane composition having an enhanced rate of cure comprising forming a mixture comprising by weight, (A) 100 parts of a devolatilized mixture comprising a vinylsiloxane fluid and a zero valent platinum complex, where the zero valent platinum complex is used in combination with the vinylsiloxane fluid in an amount sufficient to provide from 1 to about 100 ppm of platinum in the resulting devolatilized mixture and is a complex of a vinylsilane having the formula,

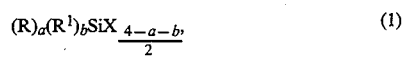

and a platinum halide, where R is $C_{(2-4)}$ alkenyl radical, or cycloalkenyl radical, $R^1$ is a $C_{(1-12)}$ monovalent hydrocarbon radical "a" is an integer equal to 1 to 4 inclusive, "b" is a whole number equal to 0 to 3 inclusive, and the sum of a+b is equal to 1 to 4 inclusive, and X is a member selected from the group consisting of a halogen radical, and a $C_{(1-4)}$ alkoxy radical, and, (B) 1 to 100 parts of a silicon hydride siloxane.

Vinyl silanes which are included within formula 1, are for example, tetravinylsilane, triallylmethylsilane, divinyldimethylsilane, trivinylphenylsilane, divinylmethylphenylsilane, cyclohexenyldimethylchlorosilane, divinylmethylchlorosilane, trivinylchlorosilane, divinylmethylethoxysilane, divinylmethylacetoxysilane, etc.

Platinum halides which can be used to make the zero valent platinum complex by reaction with the vinyl silane of formula 1 are for example, $H_2PtCl_6 \cdot nH_2O$ and metal salts such as $Na_2PtCl_6 \cdot nH_2O$, $K_2PtCl_6 \cdot nH_2O$, $Na_2PtCl_6 \cdot nH_2O$, and $K_2PtCl_6 \cdot nH_2O$. Also $PtCl_4$, and platinous type halides, such as $PtCl_2$, $Na_2PtCl_4 \cdot nH_2O$, $H_2PtCl_4$, $K_2PtBr_4$ can be used.

In addition, other platinum halides can be employed such as platinum halide complexes with aliphatic hydrocarbon, as taught in Ashby U.S. Pat. Nos. 3,159,601 and 3,159,662, such as $[(CH_2=CH_2) \cdot PtCl_2]_2$, $(PtCl_2 \cdot C_3H_6)_2$. Platinum halides shown by Lamoreaux U.S. Pat. No. 3,220,972, which is a reaction product of chloroplatinic acid hexahydrate and octyl alcohol also can be used.

Vinylsiloxane fluids which can be used in the practice of the invention can have a viscosity of from about 100 to 200,000 centipoises and from about 0.05 to about 3.5 mole %, and preferably from 0.14 to about 2 mole % of vinylsiloxy units based on the total moles of condensed organosiloxy units in the vinylsiloxane. The preferred vinyl siloxane fluids are included within the following formula:

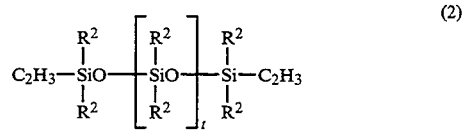

where $C_2H_3$ is vinyl, and $R^2$ is selected from $C_{(1-13)}$ monovalent hydrocarbon radicals free of olefinic unsaturation, and t is a positive integer having a value sufficient to provide a vinyl siloxane viscosity of from about 100 to 200,000 centipoises at 25° C. Preferably, $R^2$ is selected from alkyl radicals of 1 to 8 carbon atoms, such as methyl, ethyl, propyl; aryl radicals such as phenyl, methylphenyl, ethylphenyl; cycloalkyl radicals, cycloheptyl and haloalkyl radicals such as 3,3, 3-trifluoropropyl. Preferably, the vinyl siloxane has terminal units of the formula,

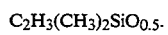

Vinylsiloxanes within Formula (2) can be prepared by equilibrating the appropriate cyclotetrasiloxane with appropriate vinyl terminated low molecular weight polysiloxane chain-stoppers. However, if vinyl organosiloxy units are desired in the backbone, a predetermined amount of cyclic vinylorganosiloxane can be used in the equilibration mixture. A preferred chain-stopper for such equilibration reaction is a low molecular weight vinyl terminated organopolysiloxane such as the corresponding disiloxane, trisiloxane, tetrasiloxane. These low molecular weight vinyl terminated polysiloxane polymers are produced by hydrolyzing the appropriate chlorosilanes particularly vinyl diorganochlorosilanes along with diorganodichlorosilanes to produce the desired chain-stopper. The chain-stopper can be equilibrated with octamethylcyclotetrasiloxane in the presence of a catalyst to produce the desired vinyl siloxane having a viscosity varying from 100 to 200,000 centipoises at 25° C. The catalyst which is utilized is preferably a mild acid catalyst, such as toluenesulfonic acid or an acid treated clay such as Filtrol, which is a sulfuric acid activated clay manufactured and sold by Engelhard Corp. of Edison, N.J. When the equilibration has proceeded to about 85% completion, the acid catalyst can be neutralized with a base or simply filtered if acid activated clay is used to leave behind the linear polymer. Preferably, excess cyclics are stripped off so that the linear polymer will have a low volatile content and be relatively pure. There can also be utilized an alkali metal hydroxide as the catalyst such as for instance potassium or sodium hydroxide.

The silicon hydride siloxane fluid can have from 0.04% to 1.4% by weight of chemically combined hydrogen attached to silicon. One form of the silicon hydride siloxane is a "coupler", having the formula:

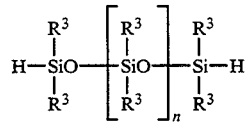
(3)

where $R^3$ is selected from $C_{(1-13)}$ monovalent hydrocarbon radicals free of olefinic unsaturation and n is an integer having a value sufficient to provide the "coupler" with a viscosity of 1 to 500 centipoises at 25° C. and from about 3 to 9 mole percent of chain-stopping diorganohydride siloxy units, based on the total moles of chemically combined siloxy units in the silicon hydride siloxane fluid.

In addition to the silicone hydride coupler of formula (3), the silicon hydride siloxane used in the heat curable organopolysiloxane compositions of the present invention also can include silicon hydride resins consisting essentially of the following chemically combined units,

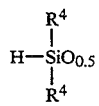

chemically combined with $SiO_2$ units, where the $R^4+H$ to Si ratio varies from 1.0 to 2.7. Silicon hydride resin also can have units of the formula:

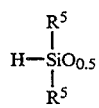

chemically combined with $SiO_2$ units and $(R^5)_2SiO$ units, where the $R^4+R^5+H$ to Si ratio varies from 1.2 to 2.7, where $R^3$, $R^4$ and $R^5$ are $C_{(1-13)}$ monovalent hydrocarbon radicals free of olefinic unsaturation selected from $R^2$ radicals.

The silicon hydride siloxane can be made by hydrolyzing the corresponding hydride chlorosilanes in the presence of an organic hydrocarbon solvent. For resins having only monofunctional units and tetrafunctional units, a hydrogen diorganochlorosilane can be hydrolyzed with a tetrachlorosilane. Resins having monofunctional siloxy units, difunctional siloxy units, and tetrafunctional siloxy units, can be obtained by hydrolyzing a hydrogen diorgano dichlorosilane, a tetrachlorosilane and a diorganodichlorosilane at particular ratios. Additional silicon hydride resin are shown by Jeram, U.S. Pat. No. 4,040,101 which is hereby incorporated by reference.

Silicon hydride siloxane fluid also can include linear hydrogen containing polysiloxane having the formula:

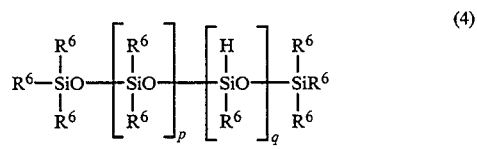
(4)

where $R^6$ is a $C_{(1-13)}$ monovalent hydrocarbon radical free of olefinic unsaturation, selected from $R^2$ radicals, and p and q are integers having values sufficient to provide a polymer having a viscosity of from 1 to 1,000 centipoises at 25° C.

The silicon hydride siloxane fluid of formula (4) can be produced by equilibrating the appropriate hydrogencyclopolysiloxane with the appropriate cyclopolysiloxane containing $R^6$ substituent groups, in combination with low molecular weight linear triorganosiloxy end-stopped chain-stoppers.

In formulas (3) and (4) and the chemically combined units described above, $R^2$, $R^3$, $R^4$, $R^5$ and $R^6$ can be the same or different radicals selected from the group consisting of alkyl radicals of 1 to 8 carbon atoms, such as methyl, ethyl, propyl, etc.; cycloalkyl radicals such as cyclohexyl, cycloheptyl, etc.; aryl radicals such as phenyl, tolyl, xylyl, etc.; and haloalkyl radicals such as 3,3,3-trifluoropropyl.

The silicon hydride siloxane coupler of formula (3) can be prepared by a hydrolysis process, or an acid catalyzed equilibration process. In the equilibration process, the appropriate cyclotetrasiloxanes are equilibrated with a low molecular weight hydrogen terminated chain-stopper, such as a dihydrogen tetraorganodisiloxane. The acid catalyzed equilibration reaction is much the same as disclosed for the production of the vinyl containing base polymer. By the hydrolysis process, the appropriate hydrogen diorganochlorosilanes are hydrolyzed with the appropriate amount of diorganodichlorosilanes to produce the desired polymer of formula (3) above. The resulting silicon hydride siloxane can be separated from undesirable cyclics by stripping.

There can be incorporated in the heat curable organopolysiloxane compositions provided by the method of the present invention from 5 to 100 parts by weight of a filler based on 100 parts by weight of the vinyl siloxane fluid. The filler can be selected from fumed silica, precipitated silica and mixtures thereof. Preferably, less than 50 parts by weight of filler, per 100 parts by weight of the vinyl siloxane fluid is utilized. In place of the reinforcing filler, such as fumed silica, and precipitated silicas, there may be utilized extending fillers which do not unduly increase the viscosity of the composition in the uncured state, by increasing to some extent the tensile strength of the composition. The reinforcing and extending fillers are for instance, titanium dioxide, lithopone, zinc oxide, zirconium silicate, silica aerogel, iron oxide, diatomaceous earth, calcium carbonate, silazane treated silicas, glass fibers, magnesium oxide, chromic oxide, zirconium oxide, aluminum oxide, alpha quartz, calcined clay, carbon, graphite, cork, cotton, synthetic fibers and so forth.

For liquid injection molding applications, it has been found desirable to limit the viscosity below 500,000 centipoises at 25° C. and more preferably, below 200,000 centipoises at 25° C.

Cure of the heat curable compositions of the present invention, can be achieved at temperatures of from 100° C. to 200° C. and preferably 135° C. to 150° C.

In order that those skilled in the art will be better able to practice the present invention, the following example is given by way of illustration and not by way of limitation. All parts are by weight.

EXAMPLE

A mixture of 1 g (1.97 mmol) of chloroplatinic acid and 15 g of dimethyldivinylsilane was heated to reflux and stirred for 2½ hrs. After removing from heat, there was then added 2 equivalents (0.35 g) of sodium bicarbonate. The mixture was then stirred for 20 minutes. The mixture was then filtered. The residue was washed with 2 g of dimethyldivinylsilane; there was obtained 11.2 g of a zero valent platinum complex having 3.9% Pt by weight in the form of a yellow solution.

There was mixed 1.5 μl of the above zero valent platinum complex and 5 g of a vinyl terminated polydimethylsiloxane fluid having an average of 25.9 dimethylsiloxy units and a viscosity of 28.8 centipoise. The resulting blend was vacuum stripped at a temperature of 70° C. and a pressure of 1 torr for 3 days. There was obtained a devolatilized platinum containing vinylsiloxane having 10 ppm of platinum and referred to as the "devolatilized silicone".

The above procedure was repeated, except that the mixture of the zero valent platinum complex and the vinylsiloxane was not stripped. There was obtained a mixture referred to as the "unstripped silicone".

Heat curable platinum-vinylsilane silicone compositions were prepared by mixing under ambient conditions, 0.96 g of a silicon hydride siloxane having an average of about 25.7 dimethylsiloxy units and terminal dimethylhydrogensiloxy units and a viscosity of 25 centipoise with 1 g of the devolatilized silicone and 1 g of the unstripped silicone respectively. The change in viscosity of the respective mixtures were measured with a Brookfield cone and plate viscometer Model DV-2, as a function of time, at ambient temperatures. The mixture employing the "devolatilized" silicone reached a viscosity of 200,000 cps in 3 minutes. The mixture using the unstripped silicone had a viscosity of 55 cps after 45 minutes and a viscosity of 400,000 cps after 1 hour.

The above results shows that the heat curable platinum catalyzed silicone composition containing the devolatilized silicone mixture has a significantly higher cure rate than the platinum catalyzed silicone composition free of the devolatilized silicone mixture.

As shown as follows, it was also found that the devolatilized silicone mixture using a reaction product of a platinum halide, such as chloroplatinic acid, and a vinylsilane in accordance with the present invention, provided a heat curable silicone compositions having a cure rate superior to a heat curable silicone compositions resulting from the use of a devolatilized silicone derived from chloroplatinic acid, and a vinylsiloxane, such as 1,3 divinyltetramethyldisiloxane instead of a vinylsilane.

A mixture of 1 μL of a platinum complex having 5% Pt by weight, and prepared from 1,3 divinyltetramethyldisiloxane and H$_2$PtCl$_6$ as described by Karstedt, U.S. Pat. No. 3,775,452, and 5 g of a vinyl terminated polydimethylsiloxane fluid was vacuum stripped as described above. One gram of the devolatilized mixture was combined with the 0.96 g of the silicon hydride siloxane fluid as described above. A viscosity of 47,000 cps was obtained after 11 minutes at ambient temperature. This value is signifcantly less than the 200,000 cps in 3 minutes shown for the silicone composition of the present invention employing the devolatilized mixture containing the zero valent vinylsilane platinum complex.

Although the above example is directed to a method using only a few of the many reaction products of a platinum halide, such as chloroplatinic acid, and a vinylsilane, the devolatilization of a mixture of such reaction product and a vinylsilicone fluid, and the combination of such mixture and a silicon hydride siloxane, it should be understood that the present invention is directed to the use of a much broader variety of platinum compounds, vinylsilanes, vinylsilicone fluids and silicon hydride siloxanes as set forth in the description preceding this example.

What is claimed is:

1. A method for making a platinum catalyzed heat curable organopolysiloxane composition having an enhanced rate of cure comprising forming a mixture comprising by weight,
   (A) 100 parts of a mixture incapable of providing a vapor pressure exceeding 0.1 atmosphere at a temperature in the range of 25°-50° C. comprising a vinylsiloxane fluid and a zero valent platinum complex, where the zero valent platinum complex is used in combination with the vinylsiloxane fluid in an amount sufficient to provide from 1 to about 100 ppm of platinum in the resulting mixture and is a complex of a vinylsilane having the formula,

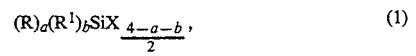

and a platinum halide, where R is C$_{(2-4)}$ alkenyl radical, or cycloalkenyl radical, R$^1$ is a C$_{(1-12)}$ monovalent hydrocarbon radical "a" is an integer equal to 1 to 4 inclusive, "b" is a whole number equal to 0 to 3 inclusive, and the sum of a+b is equal to 1 to 4 inclusive, and X is a member selected from the group consisting of a halogen radical, and a C$_{(1-4)}$ alkoxy radical, and,
   (B) 1 to 100 parts of silicon hydride siloxane.

2. A method in accordance with claim 1, where the zero valent platinum complex is a reaction product of dimethyldivinylsilane and chloroplatinic acid.

3. A method in accordance with claim 1, where the vinylsilicone fluid is a vinylpolydimethylsiloxane.

4. A method in accordance with claim 1, where the silicon hydride siloxane is a hydrogen terminated polydimethylsiloxane.

* * * * *